United States Patent
Brech

(10) Patent No.: US 9,749,804 B2
(45) Date of Patent: *Aug. 29, 2017

(54) DATA SERVICES USING LOCATION PATTERNS AND INTELLIGENT CACHING

(71) Applicant: International Business Machines Corporation, Armonk, NY (US)

(72) Inventor: Brad L. Brech, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 313 days.

This patent is subject to a terminal disclaimer.

(21) Appl. No.: 14/490,766

(22) Filed: Sep. 19, 2014

(65) Prior Publication Data

US 2015/0071173 A1 Mar. 12, 2015

Related U.S. Application Data

(63) Continuation of application No. 13/313,779, filed on Dec. 7, 2011, now Pat. No. 8,924,503.

(51) Int. Cl.
*G06F 15/167* (2006.01)
*G06F 15/173* (2006.01)
(Continued)

(52) U.S. Cl.
CPC .......... *H04W 4/028* (2013.01); *G06F 3/0604* (2013.01); *G06F 3/067* (2013.01); *G06F 3/0647* (2013.01);
(Continued)

(58) Field of Classification Search
None
See application file for complete search history.

(56) References Cited

U.S. PATENT DOCUMENTS 5,305,389 A * 4/1994 Palmer ............... G06F 12/0862
382/100
6,539,382 B1  3/2003 Byrne et al.
(Continued)

FOREIGN PATENT DOCUMENTS

EP  2388746 A1  11/2011
WO  03/001327 A2  1/2003
(Continued)

OTHER PUBLICATIONS

NPL_APPENDIX P: List of Patents or Patent Applications Treated as Related, Entitled "Improving Data Services Using Location Patterns and Intelligent Caching", filed Sep. 19, 2014.

*Primary Examiner* — Peling Shaw
(74) *Attorney, Agent, or Firm* — Patterson + Sheridan, LLP

(57) ABSTRACT

Pre-caching may decrease the response time necessary for a wireless communication network to fulfill a user request. Pre-caching includes predicting what data the user will request next and preemptively fetching that data from a network (e.g., the Internet). Additionally, the wireless communication network may predict the geographic location of the mobile device when it makes the request. Instead of pre-caching the data in the memory of the mobile device, the data may be stored at a wireless access point that has a radiation pattern that covers the predicted geographic location of the mobile device. Once the wireless access point receives the request from the mobile device for the pre-cached data, the pre-cached data may be transmitted wirelessly to the mobile device, thereby avoiding having to forward the request to rest of the communication network.

20 Claims, 6 Drawing Sheets

(51) Int. Cl.
  *H04W 4/02*     (2009.01)
  *G06F 17/30*    (2006.01)
  *H04L 29/08*    (2006.01)
  *G06F 3/06*     (2006.01)

(52) U.S. Cl.
  CPC ...... *G06F 15/167* (2013.01); *G06F 17/30902* (2013.01); *H04L 67/2847* (2013.01)

(56) References Cited

U.S. PATENT DOCUMENTS

| | | | |
|---|---|---|---|
| 7,437,509 | B2 | 10/2008 | Vayssiere |
| 7,603,131 | B2 * | 10/2009 | Wang ................... G06Q 10/087 370/328 |
| 7,743,344 | B2 | 6/2010 | Zervas et al. |
| 2002/0057678 | A1 * | 5/2002 | Jiang ................... H04L 12/5895 370/353 |
| 2003/0065712 | A1 | 4/2003 | Cheung et al. |
| 2006/0089157 | A1 | 4/2006 | Casey et al. |
| 2006/0156209 | A1 * | 7/2006 | Matsuura ............... G06Q 10/10 714/798 |
| 2006/0276196 | A1 | 12/2006 | Jiang et al. |
| 2008/0140840 | A1 | 6/2008 | Hamilton et al. |
| 2008/0162686 | A1 | 7/2008 | Kalaboukis et al. |
| 2009/0287750 | A1 | 11/2009 | Banavar et al. |
| 2009/0319177 | A1 * | 12/2009 | Khosravy .......... G06Q 30/0241 701/408 |
| 2010/0118831 | A1 * | 5/2010 | Chen ................... H04L 61/2015 370/331 |
| 2011/0252071 | A1 * | 10/2011 | Cidon ............... G06F 17/30174 707/802 |
| 2013/0067170 | A1 * | 3/2013 | Lam .................. G06F 17/30902 711/137 |
| 2013/0151652 | A1 | 6/2013 | Brech |
| 2013/0151654 | A1 | 6/2013 | Brech |

FOREIGN PATENT DOCUMENTS

| | | |
|---|---|---|
| WO | 2011/054912 A1 | 5/2011 |
| WO | 2011/156789 A1 | 12/2011 |

* cited by examiner

LOG

| MOBILE DEVICE 1 | TIME | DAY | CELLULAR TOWER |
|---|---|---|---|
| REQUEST FOR WEBSITE A | 5:20 | MONDAY | CELL TOWER 170A |
| REQUEST FOR WEBSITE A | 5:21 | TUESDAY | CELL TOWER 170A |
| REQUEST FOR WEBSITE A | 5:25 | THURSDAY | CELL TOWER 170A |
| REQUEST FOR WEBSITE B | 5:23 | MONDAY | CELL TOWER 170A |
| REQUEST FOR WEBSITE B | 5:40 | THURSDAY | CELL TOWER 170B |
| REQUEST FOR APPLICATION A | 5:32 | MONDAY | CELL TOWER 170B |
| REQUEST FOR APPLICATION A | 5:45 | WEDNESDAY | CELL TOWER 170B |
| REQUEST FOR APPLICATION A | 6:00 | FRIDAY | CELL TOWER 170C |

FIG. 4

| DATA USAGE PATTERN | |
|---|---|
| DATA USAGE | ESTIMATED ACCESS TIME |
| WEBSITE A | 5:20 - 5:25 |
| WEBSITE B | 5:23 - 5:40 |
| APPLICATION A | 5:32 - 6:00 |

505

| LOCATION PATTERN | |
|---|---|
| CELLULAR TOWER | ESTIMATED ACCESS TIME |
| TOWER 170A | 5:20 - 5:27 |
| TOWER 170B | 5:23 - 5:40 |
| TOWER 170C | 5:45 - 6:05 |

510

515

| CACHE PLAN | | |
|---|---|---|
| PRE-CACHE TIME | CELLULAR TOWER | CACHE |
| 5:23, 5:34 | TOWER 170A | WEBSITE A; WEBSITE B |
| 5:23, 5:34, 5:46 | TOWER 170B | WEBSITE A; WEBSITE B; APPLICATION A |
| 5:46 | TOWER 170C | APPLICATION A |

520, 521, 522, 525

DATA SERVICES USING LOCATION PATTERNS AND INTELLIGENT CACHING

CROSS-REFERENCE TO RELATED APPLICATIONS

This application is a continuation of co-pending U.S. patent application Ser. No. 13/313,779, filed Dec. 7, 2011. The aforementioned related patent application is herein incorporated by reference in its entirety.

BACKGROUND

Mobile computing devices (e.g., Personal Digital Assistants (PDAs), phones, laptops, tablet computers, and the like) are becoming increasingly popular. Further, many customers of wireless network providers connect to the wireless networks using multiple computing devices. In many cases, the providers struggle to maintain an infrastructure that can keep up with demand for bandwidth. One of the primary bottlenecks for providing the requested data to a mobile device is the wireless connection between the device and an antenna. Where high-speed wire-based communication networks are plentiful (e.g., fiber optic cable), the bandwidth needed to relay the request from a wireless access point to a WAN (e.g., the Internet) is plentiful. Accordingly, the ability to service a request made by a mobile device may be limited by the connection speed of the wireless communication channel. Where infrastructure has not kept up with demand, the download speed for each mobile may be lowered as more and more mobile devices compete for limited bandwidth in the wireless communication channel. Many customers, however, select which wireless network provider to subscribe to based on their download speeds. A wireless network provider with lower speeds may look less attractive to potential customers.

Because many customers demand that mobile devices be light, inexpensive, and portable, the memory (e.g., RAM or L1/L2 caches) of some mobile devices is limited when compared to the memory of other user computing devices such as desktop computers or even laptop computers. Accordingly, many mobile devices do not offer the same ability to cache large amounts of data in memory as other computing devices. This limitation prevents wireless network providers from pre-caching (or pre-fetching) large amounts of data on the mobile devices.

SUMMARY

Embodiments of the invention provide a method, system, and computer program product of caching data in a communication network. The method, system, and computer program product predict a future request from a computing device to access data using the communication network and determine a location pattern for the computing device, the location pattern comprising a previous physical location of the computing device. The method, system, and computer program product predict a future physical location of the computing device based on the location pattern. Before the future request is sent by the computing device, the method, system, and computer program product select a storage location from a plurality of storage locations that are external to the computing device based on the predicted future physical location, wherein the storage location stores the data associated with the future request.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 4 is a log of user activity in the wireless communication network, according to one embodiment of the invention.

DETAILED DESCRIPTION

Figure 1A:
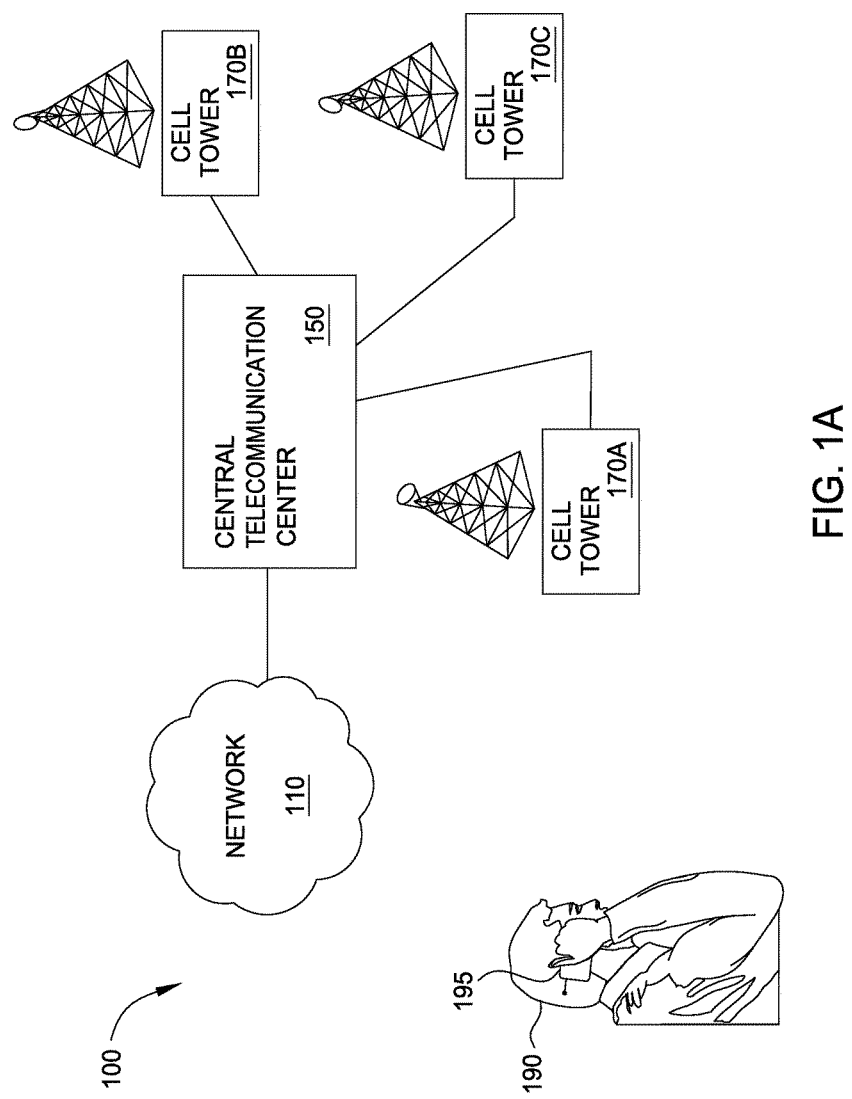
FIGS. 1A-1B illustrate a wireless communication network, according to embodiments of the invention.

The limitations of a wireless communication channel can limit the ability of a wireless network provider to quickly fulfill requests from users to access a website, download files, stream audio or video, and the like. As more and more people choose to access data wirelessly rather than relying solely on wire-based communications, wireless network provides (e.g., cell/mobile phone network providers, public transportation providers, airline carriers, and companies or institutions with a plurality of wireless access points) struggle to maintain an infrastructure that can keep up with demand. Cell phone network providers, for example, typically build large and expensive cell tower installations to satisfy customer demand. Moreover, the portability of mobile devices also means that wireless access points may be inefficiently used—i.e., too many users try to access one wireless access point but too few at another. Thus, even if a wireless network provider's infrastructure is sufficient for its customer base, the infrastructure may be inadequate at certain geographic regions.

Pre-caching may decrease the response time needed by the wireless communication network to fulfill user requests. As used herein "pre-caching" refers to the general practice of predicting what data a user will request based on historical actions. Pre-caching may reduce the latency at a congested wireless access point or, alternatively, decrease the response time even if the wireless access point has the necessary bandwidth in its wireless communication channel. Typically, pre-caching includes predicting what data the user will request next and preemptively transmitting that data to be stored in the memory of the mobile device. If the prediction is wrong, however, the network unnecessarily used up bandwidth to send data that was not needed and used limited memory on the mobile device. Thus, a wrong prediction may slow down both the wireless communication channel and the mobile device itself.

Mistakes in pre-caching may be mitigated if the data is stored at a location external to the mobile computing device—e.g., a computer system located at a wireless access point. Because spatial requirement for these computer systems is typically much less demanding than for mobile devices, the computing system may contain a much larger memory array. The data predicted to be accessed by the user may be pre-cached at this location, and if the user does request the data, the computer system may intercept the request from the user and transmit the pre-cached data rather than having to access a WAN or other server to retrieve the data. Moreover, if an incorrect prediction is made, only the bandwidth associated with the wire-base communication channel is wasted rather than the bandwidth of the wireless communication channel.

The computer system may determine what data to pre-cache based on a user's data usage pattern. The pattern may define a request as well as an estimated time that the user typically makes the request. The data usage pattern can be determined by monitoring the user's previous data requests. Similarly, the system may identify a location pattern of the user that predicts where the mobile device associated with the user will be located for an estimated time frame. This location may be generalized to include a geographic region such as the radiation pattern for a wireless access point. The usage pattern and location pattern may be correlated based on the estimated times. Thus, the network provider can pre-cache the predicted data at the predicted geographic location of the mobile device.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
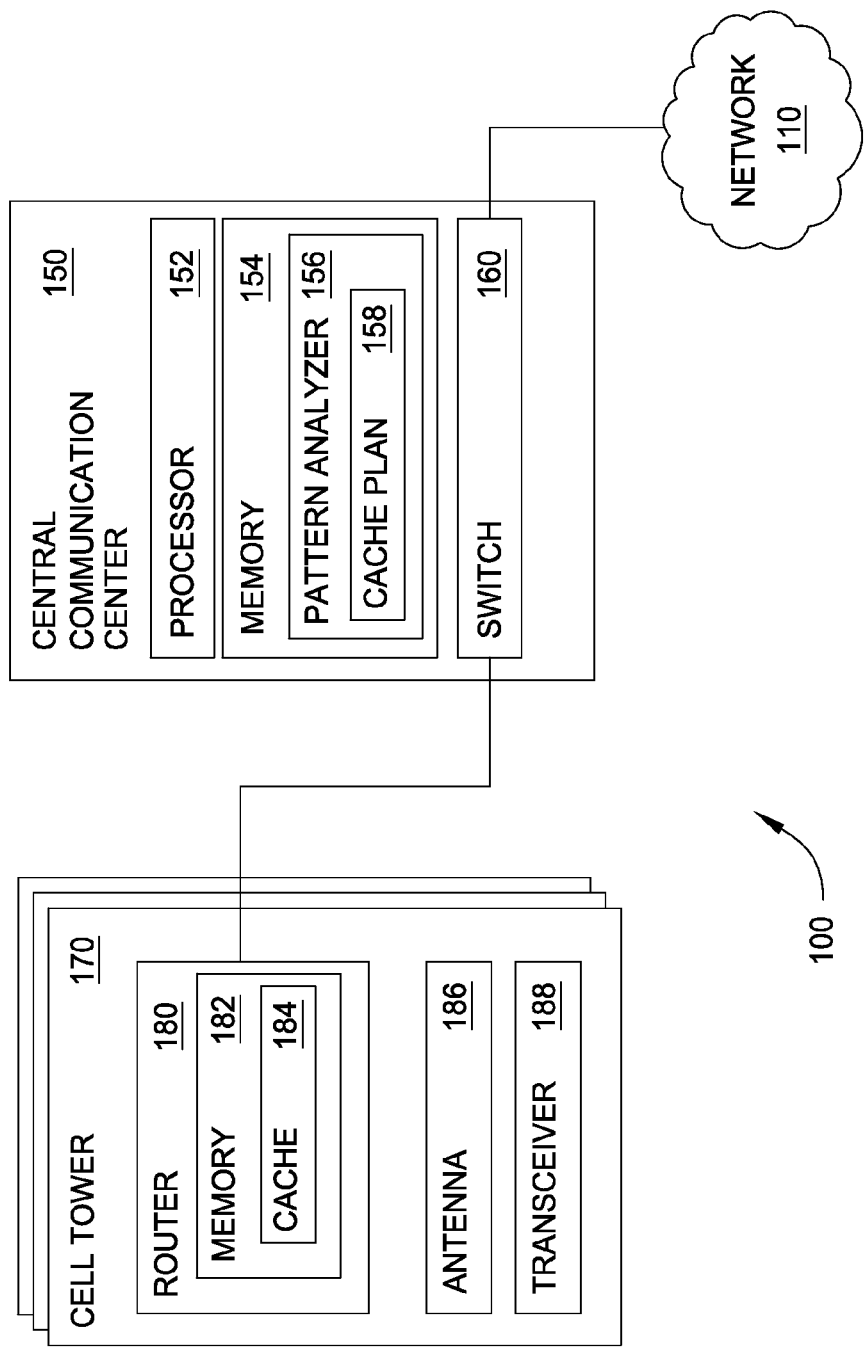

FIGS. 1A-1B illustrate a wireless communication network, according to one embodiment of the invention. Specifically, the system 100 of FIG. 1A includes a network 110, central telecommunication center 150, cell towers 170, and a user 190 associated with a mobile computing device 195. The network 110 may be connected to a plurality of servers or databases using switches, routers, network bridges, and the like to form a wide area network (WAN)—e.g., the Internet—or a local area network (LAN). In general, the network 110 provides access to data or services that are requested by the user 190—i.e., webpages, search queries, multimedia, applications, and the like. For example, a request for data may be the user 190 typing a URL into a browser, clicking on a particular link, using an application to start a video stream, and the like. In general, a request is associated with an address that is used to locate the data. As contemplated herein, an "address" can be any address that permits a user 190 to locate data stored in the network 110—e.g., IP address, URL, MAC address, FTP, or any abstraction thereof. Thus, at a later time, the system may use the address to pre-fetch the data, even if the data has changed since the user 190 last requested the data.

Central telecommunication center 150 may serve as an intermediary between the network 110 (e.g., the Internet) and wireless network comprising the cell towers 170 and the mobile device 195. Although the central telecommunication center 150 is shown as being at one central location, in another embodiment, the central telecommunication center 150 may be distributed such that its functions are performed by the individual cell towers 170.

In general, the cell towers 170 receive user requests from the user 190 via the mobile device 195 and, in response, transmit requested data to the mobile device 195. In one embodiment, the requests and data may be transmitted on the same spectrum or a different spectrum as another communication medium such as voice communication. That is, the mobile device 195 may be configured to transmit both voice signals to other telephonic devices as well as sending request to access data on the network 110 (e.g., a smartphone). However, the mobile device 195 is not limited to any particular type of mobile computing device. Non-limiting examples include PDAs, cellular or mobile phones, laptops, tablet computers, or any wireless computing device that is easily transported using batter power.

Although the present embodiments describe a cell tower used in a wireless network, the invention is not limited to such. In general, the cell towers 170 may be any type of access point that is used to communicate with computing devices.

In one embodiment, the system 100 may use any type of wireless access point for communicating with the mobile device 195. For example, the embodiments used herein may be implemented in a public transportation system for providing access to the network 110 for mobile devices that may, or may not, be configured for voice communication. Specifically, a subway system may use a plurality of wireless routers along a train's route to provide access to the network 110. Similarly, the embodiments may be implemented in a building that includes multiple wireless access points where mobile devices move between the access points.

In general, a user may send a request to access certain data or to update data stored in the network 110. This request is received wirelessly by one of the cell towers 170 which forwards the request to the central telecommunication center 150. Specifically, the cell towers 170 may translate the request from a wireless data signal to a signal that is transmitted in a cable—e.g., a copper wire or fiber optic bundle. In contrast to wireless networks, a wire-based network may have significantly less constraints on bandwidth which may permit greater download or upload speeds.

A user request may include accessing a webpage, submitting a search query to an Internet search engine, transmitting data to the network 110, streaming audio or video, or using applications that may expand the capabilities of the phone (e.g., a stock ticker or instant messenger). As used herein, a user request may be any kind of data that can be pre-cached. For example, the HTML code for a website may be sent to memory associated with cell tower 170A in anticipation that the user 190 will request to access the website in the future. Similarly, the cell tower 170A may begin to buffer a video or audio stream before the user requests that the stream start.

FIG. 1B is a block diagram of the system 100 but without the user 190 and mobile device 195. The cell tower 170 (or wireless access point) includes a router 180, one or more antennas 186, and one or more transceivers 188. In general, the cell tower 170 relays data communications between the network 110 and the mobile device 195. The antenna 186 may be configured to transmit data to and receive data from the mobile device 195. Alternatively, the cell tower 170 may use multiple antennas to send and receive wireless transmissions. The transceiver 188 includes circuitry to drive and sense the signals transmitted in the wireless channel established between the cell tower 170 and the mobile device 195.

The router 180 enables the cell tower 170 to transmit and receive data from the network 110. That is, the antenna 186 may receive a wireless transmission from a mobile device 195 which is sensed by the transceiver 188. In one embodiment, the communication protocol for the wireless transmission (e.g., long term evolution (LTE), mobile WiMAX, or evolved high-speed packet access (HSPA+)) may be different from the communication protocol for transmitting data to the central communication center 150 or the network 110 (e.g., TCP/IP). Accordingly, the transceiver 188 or router 180 may include a software or hardware component for translating data packets between the two standards. Once the data received from the wireless transmission is converted to the communication protocol used by the network 110, the router 180 may forward the data to its destination in the network 110.

The router 180 may also include a memory 182 and cache 184 for storing pre-cached data associated with the mobile device 195. That is, instead of pre-caching data in the mobile device 195, the system 100 may store the data in the memory 182 associated with the cell tower 170. Although the cache 184 is shown as being located in the router 180, the cache 184 may be physically located in a separate file system that may be communicatively coupled to the router 180. Further, the cache 184 may located separately from the antenna 186 and/or transceiver 188. That is, the router 180 and cache 184 may be located proximate to the antenna 186—e.g., in a utility box that may also include the power systems for powering the antenna 186. Accordingly, the different components in the cell tower 170 may not be located in the same physical enclosure.

Although memory 182 is shown as a single entity, memory 182 may include one or more memory devices having blocks of memory associated with physical addresses, such as random access memory (RAM), read only memory (ROM), flash memory or other types of volatile and/or non-volatile memory.

The router 180 may detect a request from the mobile device 195 for data pre-cached in cache 184. Instead of forwarding the request to the central communication center 150 or the network 110, the router 180 may send the pre-cached data to the transceiver 188 to be transmitted wirelessly to the mobile device 195. In this manner, the request and the resultant data do not need to traverse the network 110.

The central communication center 150 includes a processor 152, memory 154, and switch 160. The processor 152 may represent multiple processors or processors with multiple cores. Although memory 154 is shown as a single entity, memory 154 may include one or more memory devices having blocks of memory associated with physical addresses, such as random access memory (RAM), read only memory (ROM), flash memory or other types of volatile and/or non-volatile memory. The switch 160 may be any type of network device (e.g., router or bridge) that configured to receive and forward data packets between the network 110 and router 180.

In one embodiment, the pattern analyzer 156 may monitor the data packets flowing through the switch 160. Specifically, the pattern analyzer 156 may recognize data usage patterns associated with a particular mobile device 195. To recognize a pattern, the pattern analyzer 156 may log the different times a user accesses the same data. Based on this historical data, the pattern analyzer 156 may try to identify a pattern that the analyzer 156 may use to predict future data requests to access that same data.

In addition, the pattern analyzer 156 may determine a location pattern for the mobile device 195 by monitoring the past geographic locations of the mobile device 195. In one embodiment, the location may be recorded as the location of a wireless access point (e.g., one of the cell towers 170) that is providing wireless service to the mobile device 195. Alternatively, GPS or triangulation may be used to determine the precise location of the mobile device 195. The historical locations may be correlated according to time to identify a location pattern. Based on this pattern, the pattern analyzer 156 may be able to predict the location of the mobile device 195 at a given time.

Based on the usage data pattern and the location pattern, the pattern analyzer 156 may develop a cache plan 158. Though this will be discussed in greater detail below, the cache plan 158 instructs the system 100 to pre-cache data based on the usage data pattern. However, where to store the pre-cached data may be determined by the location pattern. Accordingly, in one embodiment, the cache plan 158 instructs the system 100 what data to pre-cache and where to store the pre-cached data.

In one embodiment, the central telecommunication center 150 may be distributed such that its functions are performed at the cell towers 170 themselves. The cell towers 170 may be directly connected to the network 110 and each may include a pattern analyzer 156 for identifying patterns. Thus, each respective pattern analyzer 156 may develop a cache plan 158 for the particular cell tower 170 rather than one centralized pattern analyzer.

Figure 2:
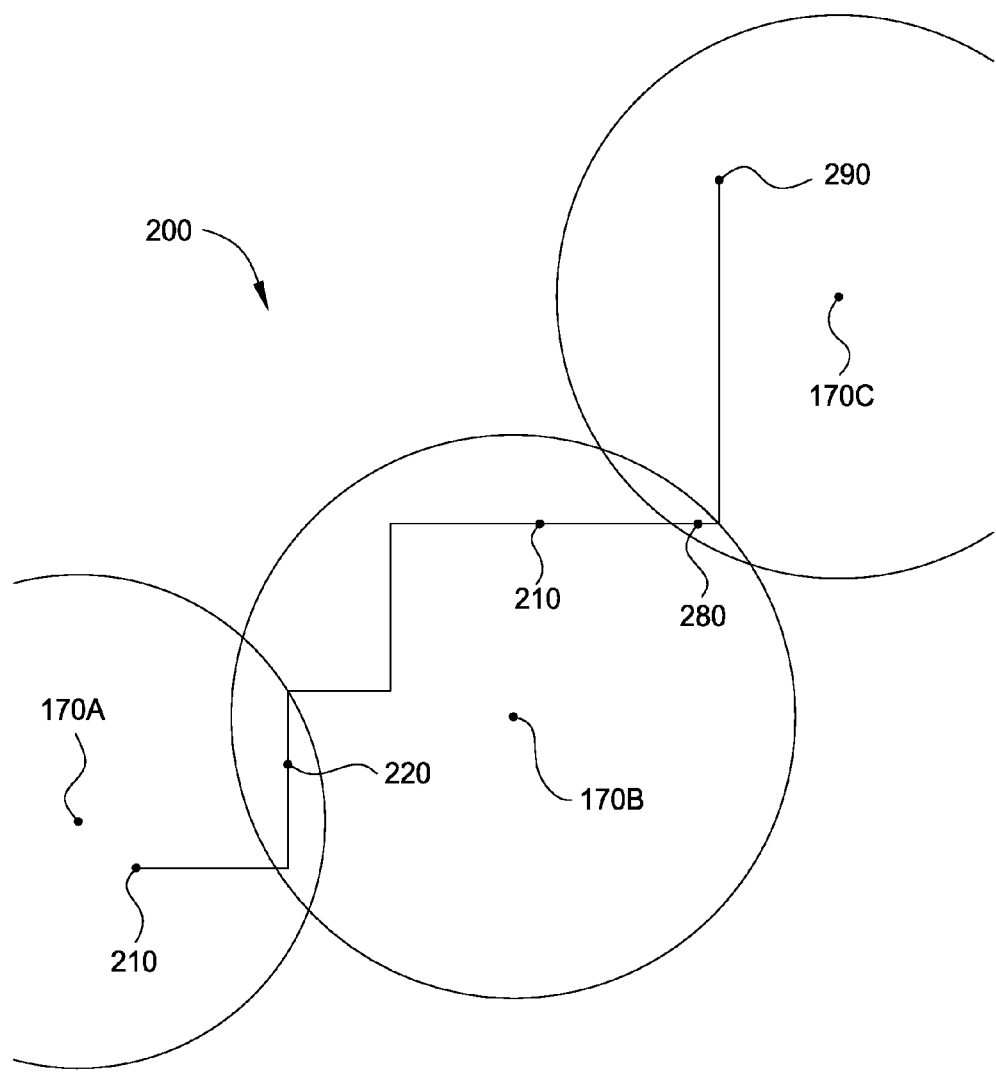
FIG. 2 is a map of a path of mobile device through the wireless communication network of FIG. 1, according to one embodiment of the invention.

FIG. 2 is a map of a path of user through the wireless communication network of FIG. 1, according to one embodiment of the invention. The route drawn between starting point 210 and ending point 290 may illustrate, for example, the user's 190 typical commute from work to home. Here, the route takes the user 190 through the radiation patterns of the three cell towers 170A-C. Each cell tower 170 has an associated radiation pattern for its one or more antennas 186. The circular radiation patterns represent an area where the mobile device 195 can wirelessly communicate with the cell tower 170. Although the pattern is shown as a circle with the antenna 186 of the cell tower 170 located at the center, the antennas 186 may be designed to produce any desired radiation pattern. As shown, the user 190 begins her commute in the radiation pattern of cell tower 170A, passes through the region covered by cell tower 170B, and ends her commute in the radiation pattern of cell tower 170C.

Note that the user 190 may be in the radiation pattern of two cell towers simultaneously—e.g., points 220 and 280. The user 190 is able to transfer seamlessly between cell towers 170 in a process called handover or handoff. That is, the voice or data communication between the mobile device 195 and the different cell towers 170 is uninterrupted. However, this feature is not necessary to practice the embodiments disclosed herein—i.e., the radiation patterns for the wireless access points do not need to overlap. Furthermore, the embodiments disclosed herein may still be implemented if the mobile device 195 passes through a geographic region that is not included in any radiation pattern—i.e., a location where the mobile device 195 is unable to communicate with any wireless access point.

Moreover, the user 190 may not move at the same rate through the map 200. For example, if the user 190 uses public transportation, the user 190 may stop at point 250 to transfer buses or trains.

Figure 3:
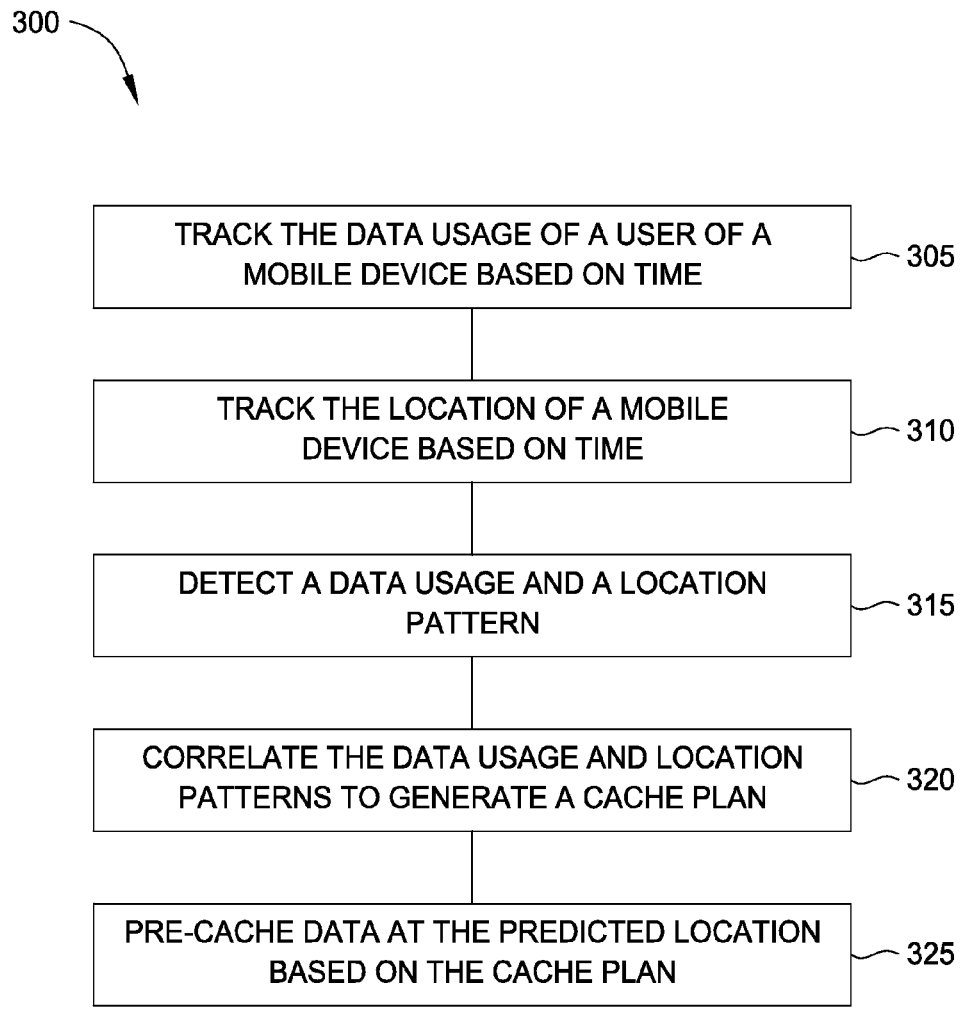
FIG. 3 is a flow diagram of a technique for pre-caching data in the wireless communication network, according to one embodiment of the invention.

FIG. 3 is a flow diagram of a technique for pre-caching data in the wireless communication network, according to one embodiment of the invention. At step 305, the technique 300 tracks the data usage of a user of a mobile device based on time. For example, the pattern analyzer 156 may monitor all the data being requested by a mobile device 195 from the network 110. The pattern analyzer 156 may record historical data (e.g., create a log) of the different requests made by the mobile device 195 based on the time the requests are received.

At step 310, the pattern analyzer 156 may record the location of the mobile device 195 based on a time of day. For example, the pattern analyzer may record, at intervals, the geographic location of the mobile device such as a geographic region covered by of a radiation pattern or a precise location based on GPS. Alternatively or additionally, the location may be recorded each time a request for data is received by the mobile device 195. That is, the pattern analyzer 186 may record both the data requested and the location of the mobile device 195 when the request was made.

FIG. 4 is a log of user activity in the wireless communication network, according to one embodiment of the invention. Specifically, the illustrated table is a log 400 of historical data associated with mobile device 195. Column 405 lists multiple requests from the mobile device 195 to access data or functions provided by network 110. For example, the mobile device 195 may download the HTML code for Website A or send a request to use Application A. Here, Application A may be a real-time stock ticker or an application that permits a user to stream audio or video where the data is transmitted via the network 110.

Columns 410 and 415 list the time and day that the request occurred—i.e., a timestamp. Recording both the time and the day may help the pattern analyzer 156 to detect different patterns better than relying solely on the time the request was received. For example, referring to FIG. 2, the user 190 may take the illustrated path only on workdays when she is commuting from work to home. Thus, recording the day in column 415 may enable the pattern analyzer to recognize patterns with increased granularity—i.e., patterns based on the days of the week.

Column 420 lists the location of the mobile device 195 when the pattern analyzer 156 detects a request from the mobile device 195. The data packets transmitted from the cell tower 170 to the network 110 may include source information that the pattern analyzer 156 may read to determine the current location of the mobile device 195. For example, a header of the data packets may include a MAC address associated with the router 180. The pattern analyzer 156 may include a look-up table for the MAC addresses which permits it to link each data packet to a specific router 180 on a specific cell tower 170. This information may then be used to identify the geographic region that contains the mobile device 195. Although the log 400 records the location of the mobile device 195 when a request is received, in another embodiment, the pattern analyzer 156 may also monitor the location of the mobile device at intervals using GPS. However, this invention is not limited to any particular technique of identifying the geographic location of the mobile device 195 (or user 190).

Returning to FIG. 3, at steps 315, the pattern analyzer 156 may identify one or more patterns associated with the log 400. In one embodiment, the pattern analyzer may identify two patterns: a data usage pattern and a location pattern.

Figure 5A:
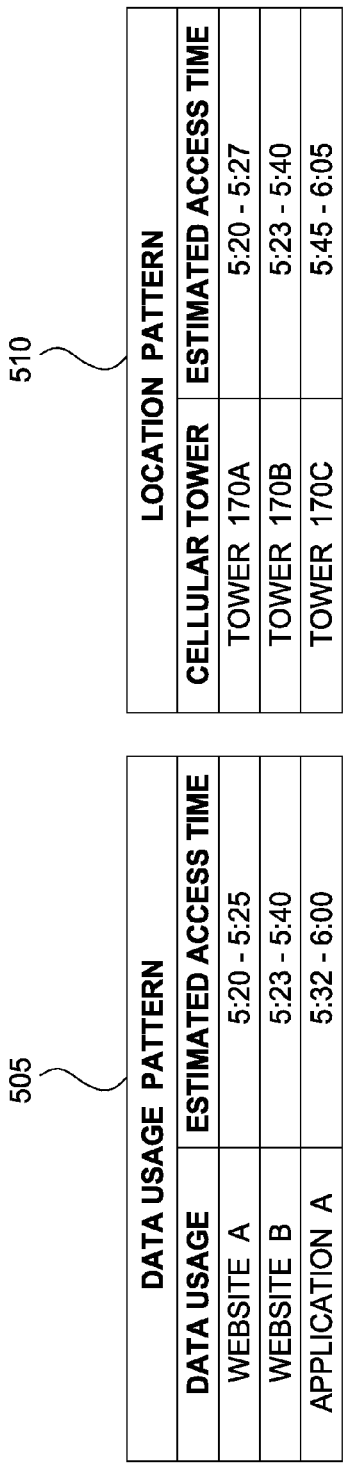
FIGS. 5A-5B are patterns associated with generating a cache plan for a mobile device in the wireless communication network, according to embodiments of the invention.
Figure 5B:
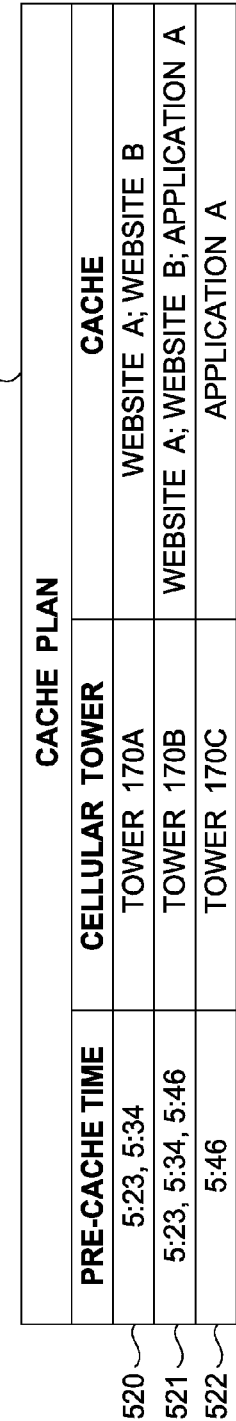

FIGS. 5A-5B are patterns associated with generating a cache plan for a mobile device in the wireless communication network. Specifically, FIG. 5A shows a data usage pattern 505 and a location pattern 510. The data usage pattern 505 abstracts the different requests to an estimated time frame that the request is received. For example, the data usage pattern 505 illustrates that the mobile device 195 typically accesses Website A between 5:20 and 5:25. Though not shown, data usage pattern 505 may limited to only weekdays—i.e., the data usage pattern 505 does apply for to the weekend.

Although the data usage pattern 505 (and location pattern 510) is referred to as a single pattern, it may be considered as a data structure that contains multiple patterns that are each associated with a specific user request. For example, the pattern analyzer 156 identifies a pattern of user requests associated with Website A, another pattern associated with Website B, and another pattern associated with Application A where the data sources are accessed at predictable times.

The present invention is not limited to any particular technique for identifying a predictable pattern from historical data. Simple analytics may be written to analyze the historical data and identify patterns. For example, the pattern analyzer 156 may wait for certain period of time or for a certain number of similar requests for the same data before trying to identify a pattern associated with the usage data.

After identifying a pattern, the pattern analyzer 156 may formulate the estimated access time based on the time associated with the requests in the log 400. In one of the most simplistic models, the pattern analyzer 156 may determine the earliest and latest times that the user 190 sends a request to access a website—i.e., 5:20 and 5:25—and use these extremes to generate the estimated access time. However, the pattern analyzer 156 may determine that a pattern or an estimate access time cannot be identified if the extremes are too varied or the standard deviation is too large—e.g., the difference between the earliest and latest access time is more than an hour. In that case, pre-caching based on that historical data may be an inefficient use of the system's 100 resources.

The pattern analyzer 156 may use different methods for formulating the estimated access time. For example, the analyzer 156 may use weights to determine the estimated access time based on the number of entries with the same timestamp. One of ordinary skill in the art will recognize the different analytical techniques for using a plurality of timestamps to determine an estimated time frame. Additionally, the estimated access time may be a single time (e.g., an average time) rather than a range of times.

Determining a pattern and generating the estimated access time for the location pattern 510 may be based on the same techniques discussed above regarding the data usage pattern 505. The location pattern 510 further illustrates that the estimated access time may extend beyond the earliest or latest timestamp. For example, the estimated access time for tower 170A is 5:20-5:27 yet the latest recorded timestamp in the log 400 is 5:23. The pattern analyzer 156 may extend the estimated access time to account for any uncertainties. For example, if the system 100 has received too few request to reliable identify a pattern but yet the requests are received at similar times, the pattern analyzer 156 may extend the estimated access time to represent the uncertainty of the historical data. As more requests are received, the estimated access time may be updated.

Returning to FIG. 3, at step 320 the data usage and location patterns 505, 510 may be correlated to generate a cache plan 158.

FIG. 5B illustrates a cache plan 515 generated from the data usage pattern 505 and location pattern 510. In cache plan 515, the estimated access time from the respective patterns 505, 510 are used to correlate the data. The pattern analyzer 156 may start with Website A and determine that it is typically accessed by the mobile device 195 between 5:20-5:25. Based on this estimated access time, the pattern analyzer 156 may hash through the location pattern table 510 to determine in which geographic region the mobile device 195 will likely be located. Here, the location pattern 510 predicts that the mobile device 195 will be located in the radiation pattern of cell tower 170A during the entire access time. Accordingly, the cache plan 515 associates Website A with cell tower 170A.

The cache plan 515 may also include a pre-cache time that instructs the system when to pre-cache the data at the location associated with the particular request. Specifically, row 520 instructs the system 100 at 5:22 (or sometime before this time) to use the network 110 to fetch the data associated with Website A and store it at the cache 184 associated with cell tower 170A. Accordingly, the cache plan 158 predicts at what time a mobile device 195 will request certain data and stores that data at a predicted location of the mobile device 195.

As shown by column 525, the data is pre-cached according to the average time the mobile device 195 requested the data. That is, the pattern analyzer 156 may evaluate the log 400 to determine the average time the request was received. However, the pre-caching time in column 525 may be based on a different time such as the earliest access time.

In one embodiment, the system 100 may pre-cache the data any time before the time listed in column 525. For example, the system 100 may pre-cache data before the pre-cache time if network traffic is below a certain threshold. If the network traffic of the system 100 is below the threshold, the cell towers 170 may use the available bandwidth to pre-cache the data in their respective caches 184 without substantially affecting the ability of the system 100 to respond to current requests made by mobile devices 195. However, the system 100 may only pre-cache the data if the current time is within a certain time period of the pre-cache time to ensure the pre-cached data is not stale—i.e., out of date. Similarly, data stored in the cache 184 may be refreshed at predefined intervals to make sure the data is still accurate. For example, if the cache 184 is used to buffer an audio stream, the system 100 may continue to buffer the audio stream into the cache 184 in anticipation of the mobile device 195 transmitting a request to connect to the stream.

The pre-cached data may also expire after a certain period of time. The pre-cached data may be associated with a timestamp in the cache 184 that determines when the data should be expelled from the cache—i.e., the prediction is deemed incorrect.

In one embodiment, this timestamp may be based on the strength of the prediction. Specifically, the pattern analyzer 156 may assign a timestamp based on the likelihood that the mobile device 195 will submit a request to access the data. For example, referring to FIG. 4, the log 400 contains three requests associated with Website A but only two for Website B. Accordingly, based on the sample size, the pattern analyzer 156 may assign a higher confidence score for the pattern associated with Website A to indicate that its pattern is more reliable than the pattern associated with Website B. The pattern analyzer 156 may then use the confidence score to assign a lengthier timestamp for pre-cached data associated with Website A than pre-cached data associated with Website B.

Rows 520 and 521 illustrate the cache plan or plan 515 associated with cell towers 170A and 170B. As shown, a cell tower 170 may be associated with one or more different requests (or no requests) received from the mobile device 195. However, for the data associated with a particular request to be pre-cached at a cell tower 170, the mobile device 195 does need to have previously submitted the request to the cell tower 170. Using Row 521 as an example, the system 100 pre-caches the data associated with Website A at cell tower 170B; however, the log 400 does not include an entry where Website A was ever accessed while the mobile device 195 was communicating with cell tower 170B. Because the pattern analyzer 156 generates an estimated access time which may be greater than the earliest or latest time entries, the cache plan 515 may pre-cache data at cell towers 170 that never previously received the associated request. Specifically, the estimate access time for cell tower 170B is from 5:23-5:50 and the estimated access time for a request associated with Website A is between 5:20-5:25. This overlap signals to the pattern analyzer 156 to also pre-cache Website A at cell tower 170B even though a request for accessing Website A was never received at cell tower 170B.

Moreover, column 525 of rows 520 and 521 includes multiple pre-cache times that correlate to the multiple requests that are pre-cached in each of the cell towers 170A and 170B.

In one embodiment, instead of relying only on overlap of the estimated access times, the cache plan 515 may pre-cache data associated with a particular request if the estimated access times of the cell tower 170 and request are within a certain predetermined time from of one another. This predetermined time may be based on the amount of available storage in the caches 184 of the cell towers 170. Stated differently, the cache plan 515 may pre-cache the same data in a multiple towers even if there is a low likelihood that the mobile device 195 will be within the radiation pattern of one or more of the towers 170. For example, the estimated access times associated with Website A and cell tower 170B overlap only slightly. Nonetheless the cache plan 515 pre-caches the data associated with Website A in both cell towers 170A and 170B. This may be because the storage costs of the caches 184 may be inexpensive when compared to the decreased response time of the system 100 when accessing pre-cached data rather than requiring the request to be forward to the network 110.

Row 522 illustrates that only the data associated with Application A is pre-cached at cell tower 170C. Thus, the estimated access time for cell tower 170C does not overlap (or is not close enough to) the estimated access times for Website A and B.

In one embodiment, step 320 may be omitted. That is, the pattern analyzer 156 may not need to correlate the two different patterns to develop a cache plan using the estimated access time. Alternatively, the pattern analyzer 156 may skip generating the estimated access times and, after determining that a data usage pattern and location pattern exist, combine the two patterns based on the measured times. Here, the resulting cache plan would require pre-caching data associated with Website A only in cell tower 170A, pre-caching data associated Website B at cell tower 170A and 170B, and pre-caching data associated Application A at cell tower 170B and 170C.

At step 325, the system 100 may store the pre-cached data according to the cache plan 515. If the mobile device 195 transmits a request associated with the pre-cached data, the router 180 on the respective cell towers 170 may determine that the data associated with the request is already stored in the cache 184. Instead of forwarding the request to the network 110, the router 180 may immediately transmit the data stored in the cache 184 to the mobile device using the transceiver 188.

In one embodiment, the data usage and location patterns for a first mobile device may be used to pre-cache data for a second mobile device. If the same user uses two different devices on the mobile network (e.g., a smartphone and laptop computer), the pattern analyzer 156 may use the patterns associated with one of those device to pre-cache data for another device. For example, if the user typically accesses the Internet on her commute using a smartphone, but one day uses her laptop instead, the pattern analyzer 156 may recognize that the two devices are associated with the same user and use the data usage and location patterns of the smartphone to pre-cache data for the laptop. Moreover, the pattern analyzer 156 may not distinguish between the mobile devices associated with the user. That is, when developing or identifying patterns, the pattern analyzer 156 may treat data received from a plurality of mobile devices from the same user as a single mobile device. Accordingly, if the user changes between mobile devices but follows the same data usage patterns, the pattern analyzer 156 can still have the correct data pre-cached at the relevant geographic location.

In one embodiment, the system 100 may perform additional pre-caching based on links in a pre-cached webpage. For example, if the usage data pattern identifies that the user 190 consistently accesses the same webpage within an estimated time frame, the system 100 may also pre-cache (or pre-fetch) one or more webpages associated with the links of the already pre-cached webpage. Thus, after the pattern analyzer 156 determines to pre-cache a webpage based on the usage data pattern, the analyzer 156 may scan the code describing the pre-cached webpage to determine whether the webpage contains links to other webpages. If so, the pattern analyzer 156 may instruct the cell tower 170 to also pre-cache the webpages associated with those links. In this manner, the system 100 may further reduce the response time if the user 190 navigates to a different webpage using the links.

CONCLUSION

Pre-caching may decrease the response time necessary for a wireless communication network to fulfill a user request. Pre-caching includes predicting what data the user will request next and preemptively fetching that data from a network. Additionally, the wireless communication network may predict the geographic location of the mobile device when it makes the request. Instead of pre-caching the data in the memory of the mobile device, the data may be stored at a wireless access point that has a radiation pattern that covers the predicted geographic location of the mobile device. Once the wireless access point receives the request from the mobile device for the pre-cached data, the pre-cached data may be transmitted to the mobile device, thereby avoiding having to forward the request to rest of the communication network.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of caching data in a communication network, comprising:
    predicting a future request from a computing device to access data using the communication network;
    determining a location pattern for the computing device, the location pattern comprising a previous physical location of the computing device;
    predicting a future physical location of the computing device based on the location pattern; and
    before the future request is sent by the computing device, selecting a storage location from a plurality of storage locations that are external to the computing device based on the predicted future physical location, wherein the storage location stores the data associated with the future request.

2. The method of claim 1, wherein predicting the future request is based on a previous request from the user, wherein both the previous request and the future request instruct the communication network to provide data associated with a same location identifier.

3. The method of claim 2, wherein the previous request is associated with a time of occurrence, and wherein the previous physical location is associated with a time that the computing device was at the previous physical location, the method further comprising
    correlating the previous request to the previous physical location based on the time of occurrence and the time that the computing device was at the previous physical location.

4. The method of claim 2, wherein the computing device transmits the previous request wirelessly, wherein the previous physical location is a geographic region associated with an antenna of a wireless access point, and wherein the computing device is not currently wirelessly coupled to the antenna.

5. The method of claim 1, further comprising estimating a time frame that the future request will be sent from the computing device based on the time of occurrence.

6. The method of claim 1, wherein determining a location pattern for the computing device further comprises:
    estimating a time frame that the computing device will be at the future physical location based on the time that the computing device was at the previous physical location; and
    correlating the future physical location to a wireless access point that is configured to communicate wirelessly with the computing device.

7. The method of claim 1, wherein the computing device is configured for wireless communication, and wherein the plurality of storage locations are each located in a same general physical location as an antenna configured to communicate wirelessly with the computing device.

8. A computer program product for caching data in a communication network, the computer program product comprising:
    a computer-readable storage medium having computer-readable program code embodied therewith, the computer-readable program code configured to:
        predict a future request from a computing device to access data using the communication network;
        determine a location pattern for the computing device, the location pattern comprising a previous physical location of the computing device;
        predict a future physical location of the computing device based on the location pattern; and
        before the future request is sent by the computing device, select a storage location from a plurality of storage locations that are external to the computing device based on the predicted future physical location, wherein the storage location stores the data associated with the future request.

9. The computer program product of claim 8, wherein predicting the future request is based on a previous request from the user, wherein both the previous request and the future request instruct the communication network to provide data associated with a same location identifier.

10. The computer program product of claim 9, wherein the previous request is associated with a time of occurrence, and wherein the previous physical location is associated with a time that the computing device was at the previous physical location, further comprising computer-readable program code configured to:

correlate the previous request to the previous physical location based on the time of occurrence and the time that the computing device was at the previous physical location.

11. The computer program product of claim 9, wherein the computing device transmits the previous request wirelessly, wherein the previous physical location is a geographic region associated with an antenna of a wireless access point, and wherein the computing device is not currently wirelessly coupled to the antenna.

12. The computer program product of claim 8, further comprises computer-readable program code configured to:
estimate a time frame that the future request will be sent from the computing device based on the time of occurrence.

13. The computer program product of claim 8, wherein determining a location pattern for the computing device further comprises computer-readable program code configured to:
estimate a time frame that the computing device will be at the future physical location based on the time that the computing device was at the previous physical location; and
correlate the future physical location to a wireless access point that is configured to communicate wirelessly with the computing device.

14. The computer program product of claim 8, wherein the computing device is configured for wireless communication, and wherein the plurality of storage locations are each located in a same general physical location as an antenna configured to communicate wirelessly with the computing device.

15. A system for caching data in a communication network, comprising:
a computer processor; and
a memory containing a program that, when executed on the computer processor, performs an operation for processing data, comprising:
predicting a future request from a computing device to access data using the communication network;
determining a location pattern for the computing device, the location pattern comprising a previous physical location of the computing device;
predicting a future physical location of the computing device based on the location pattern; and
before the future request is sent by the computing device, selecting a storage location from a plurality of storage locations that are external to the computing device based on the predicted future physical location, wherein the storage location stores the data associated with the future request.

16. The system of claim 15, wherein predicting the future request is based on a previous request from the user, wherein both the previous request and the future request instruct the communication network to provide data associated with a same location identifier.

17. The system of claim 16, wherein the previous request is associated with a time of occurrence, and wherein the previous physical location is associated with a time that the computing device was at the previous physical location, the operation further comprises:
correlating the previous request to the previous physical location based on the time of occurrence and the time that the computing device was at the previous physical location.

18. The system of claim 16, wherein the computing device transmits the previous request wirelessly, wherein the previous physical location is a geographic region associated with an antenna of a wireless access point, and wherein the computing device is not currently wirelessly coupled to the antenna.

19. The system of claim 15, wherein the operation further comprises estimating a time frame that the future request will be sent from the computing device based on the time of occurrence.

20. The system of claim 15, wherein determining a location pattern for the computing device further comprises:
estimating a time frame that the computing device will be at the future physical location based on the time that the computing device was at the previous physical location; and
correlating the future physical location to a wireless access point that is configured to communicate wirelessly with the computing device.

* * * * *